United States Patent
Olivieri et al.

(10) Patent No.: US 6,212,287 B1
(45) Date of Patent: *Apr. 3, 2001

(54) METHOD FOR IDENTIFYING MARKING STRIPES OF ROAD LANES

(75) Inventors: Massimiliano Olivieri, Pesaro; Vito Fabbrizio, Piacenza; Roberto Guerrieri, Bologna, all of (IT); Alan Kramer, Berkeley, CA (US)

(73) Assignee: SGS-Thomson Microelectronics S.R.L., Agrate Brianza (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,956

(22) Filed: Oct. 17, 1997

(30) Foreign Application Priority Data

Oct. 17, 1996 (IT) .................................. 96A002154

(51) Int. Cl.$^7$ .............................. G06K 9/00; G06K 9/64; G06K 9/20; G01C 22/00
(52) U.S. Cl. ...................... 382/104; 382/279; 382/283; 701/28
(58) Field of Search .................. 382/104, 103, 382/279, 281, 283; 701/23, 28

(56) References Cited

U.S. PATENT DOCUMENTS

| | | | |
|---|---|---|---|
| 5,398,292 | * | 3/1995 | Aoyama ................................ 382/199 |
| 5,555,312 | * | 9/1996 | Shima et al. ........................ 382/104 |
| 5,706,355 | * | 1/1998 | Raboisson et al. .................. 382/104 |
| 5,790,403 | * | 8/1998 | Nakayama .......................... 382/281 |
| 5,835,614 | * | 11/1998 | Aoyama et al. ..................... 382/104 |

FOREIGN PATENT DOCUMENTS 2674354   9/1992  (FR).

OTHER PUBLICATIONS

Vision in Man and Machine, Martin D. Levine; McGraw Hill Book Company, ISBN 0-07-037446-5, pp. 176-180, 1985.*
"Neural Networks on a Chip" *World Congress on Neurel Networks*, vol. 2, pp. 453-454, Jul. 1995.
"Parallel and Local Feature Extraction: A Real-Time Approach to Road Boundary Detection," *IEEE Transactions on Image Processing*, vol. 4, No. 2, pp. 217-223, Feb. 1995.
"A Discriminating Feature Tracker for Vision-Based Autonomous Driving," *IEEE Transactions on Robotics and Automation*, vol. 10, No. 6, pp. 769-775, Dec. 1994.
"Lane Recognition System for Guiding of Autonomous Vehicle," *Suzuki*, et al., pp. 196-201 (no date available).
"Road and Relative Ego-State Recognition," *Behringer*, et al., pp. 385-390 (no date available).

* cited by examiner

Primary Examiner—Amelia Au
Assistant Examiner—Mehrdad Dastouri
(74) Attorney, Agent, or Firm—Jenkens & Gilchrist, P.C.; Theodore E. Galanthay

(57) ABSTRACT

A method, in a system for aiding the guidance of a vehicle, for identifying marking stripes of road lanes. A road image is subjected to a convolution operation with a mask matrix so as to identify discontinuities present in the image. The resulting convolved image is compared with a threshold value and a representation of the marking stripes is determined. The mask matrix is set in such a way as to eliminate at least partially the discontinuities which do not correspond to the marking stripes.

58 Claims, 6 Drawing Sheets

METHOD FOR IDENTIFYING MARKING STRIPES OF ROAD LANES

FIELD OF THE INVENTION

The present invention relates generally to a method for identifying marking stripes demarcating road lanes and, in particular, a method for identifying marking stripes in a system for aiding the guidance of a vehicle.

BACKGROUND OF THE INVENTION

Methods capable of determining marking stripes demarcating road lanes are commonly used in systems for aiding vehicle guidance. Such methods, as described, for example, in "Parallel and Local Feature Extraction: A Real-Time Approach to Road Boundary Detection," A. Broggi—*IEEE Transactions On Image Processing,* Vol. 4, No. 2, February 1995, pp. 217–223, typically comprise a phase of low-level filtering which extracts the relevant characteristics from the road image, followed by a phase of high-level analysis which determines a representation of the marking stripes. Rather simple processing techniques, which exhibit a low computational cost, capable of identifying the discontinuities present in the road image are generally used in the low-level filtering phase. For example, the image is subjected to a mathematical convolution operation with a suitable mask (or kernel) matrix, and the result is compared with a specified threshold value. The mask always exhibits very small dimensions, as in the case of the Prewitt operator, consisting of a matrix of three rows and three columns of ternary elements (−1, 0, +1). Such techniques, however, also pick out the outlines associated with various objects present in the image, for example, other vehicles, road signs, shadows, and the like (noise). They therefore require the use of complex high-level analyses for eliminating noise, with heavy demands for computational power.

Other techniques, such as the use of geometrical models described in "A Morphological Model-Driven Approach to Real-Time Road Boundary Detection for Vision-Based Automotive Systems," A. Broggi, S. Berte—*Proc. Second IEEE Workshop on Applications of Computer Vision,* pp. 73–90, Dec. 5–7, 1994—IEEE Computer Society, transform the image on the basis of a predefined model so as then to determine the representation of the marking stripes of the road lanes. Such transformations have, however, to be applied over extensive portions of the image and require the use of rather complex basic operations. They therefore need large processing resources and cannot be carried out efficiently by means of standard digital systems.

What is needed is a method for identifying marking stripes demarcating road lanes which obviates the aforesaid drawbacks.

SUMMARY OF THE INVENTION AND ADVANTAGES

Accordingly, the present invention provides, in a system for aiding the guidance of a vehicle, a method for identifying marking stripes demarcating at least one road lane in a road image represented by a matrix of elements each indicative of the luminosity level of an elementary portion of the image. The method comprises the steps of setting a mask matrix, determining a convolved image matrix via a convolution operation between the matrix of the road image and the mask matrix so as to identify luminosity discontinuities present in the image, determining a binary image matrix in which each element has a first (0) or a second (1) binary value depending on the result of a comparison of a corresponding element of the convolved image matrix with a threshold value, and determining from the binary image matrix a representation of the marking stripes. The step of setting the mask matrix includes determining a value L indicative of the number of elements of the image matrix corresponding to the width of the marking stripes wherein each row of the mask matrix comprising L contiguous elements having a first value and wherein the other elements of the row having a second value of opposite sign to the first value.

The present invention also provides a method, in a system for aiding the guidance of a vehicle, for identifying marking stripes demarcating at least one road lane in a road image represented by a matrix of elements each indicative of the luminosity level of an elementary portion of the image. The method comprises the steps of determining a first and a second convolved image matrix via a convolution operation between the matrix of the road image and, respectively, a first and a second mask matrix so as to identify luminosity discontinuities present in the image, the elements of each row of the second mask matrix being equal in reverse order to the elements of a corresponding row of the first mask matrix. The method also includes the step of determining a first and a second binary image matrix in which each element has a first (0) or a second (1) binary value depending on the result of a comparison of a corresponding element, respectively, of the first and of the second convolved image matrix with, respectively, a first and a second threshold value. The method further includes the step of determining a single binary image matrix via a logic AND operation between the corresponding elements of the first and of the second binary image matrix and determining from the single binary image matrix a representation of the marking stripes.

The present invention advantageously reduces the effects of noise, produces a good signal/noise ratio, and limits the amount of information which has to be processed in the high-level analysis phase, without requiring the use of complex operations or the introduction of complicated analysis models.

Another advantage of the present invention is that it requires only low-level arithmetic operations such as sums and multiplications, can therefore be carried out using standard digital devices, and allows a high degree of parallelism in the various basic operations. Moreover, these low-level operations are suitable for being carried out very efficiently using dedicated analog architectures with a high level of parallelism.

Another advantage of the present invention is that it offers good performance even with low levels of accuracy of the information used, i.e., with a limited number of bits assigned to each element of the image and of the mask. Hence, the present invention is suitable for being carried out on low-precision analog processing systems which, by virtue of their speed, are able to perform the operations required very efficiently.

Another advantage of the present invention is that it offers high reliability under different ambient conditions and good real-time speed of response, using low-cost compact systems, thereby allowing mass-consumer applications.

BRIEF DESCRIPTION OF THE DRAWINGS

Further characteristics and advantages of the present invention will emerge from the following description, given by way of non-limiting embodiments, with reference to the appended figures in which.

DETAILED DESCRIPTION OF A PREFERRED EMBODIMENT OP THE INVENTION

Figure 1:
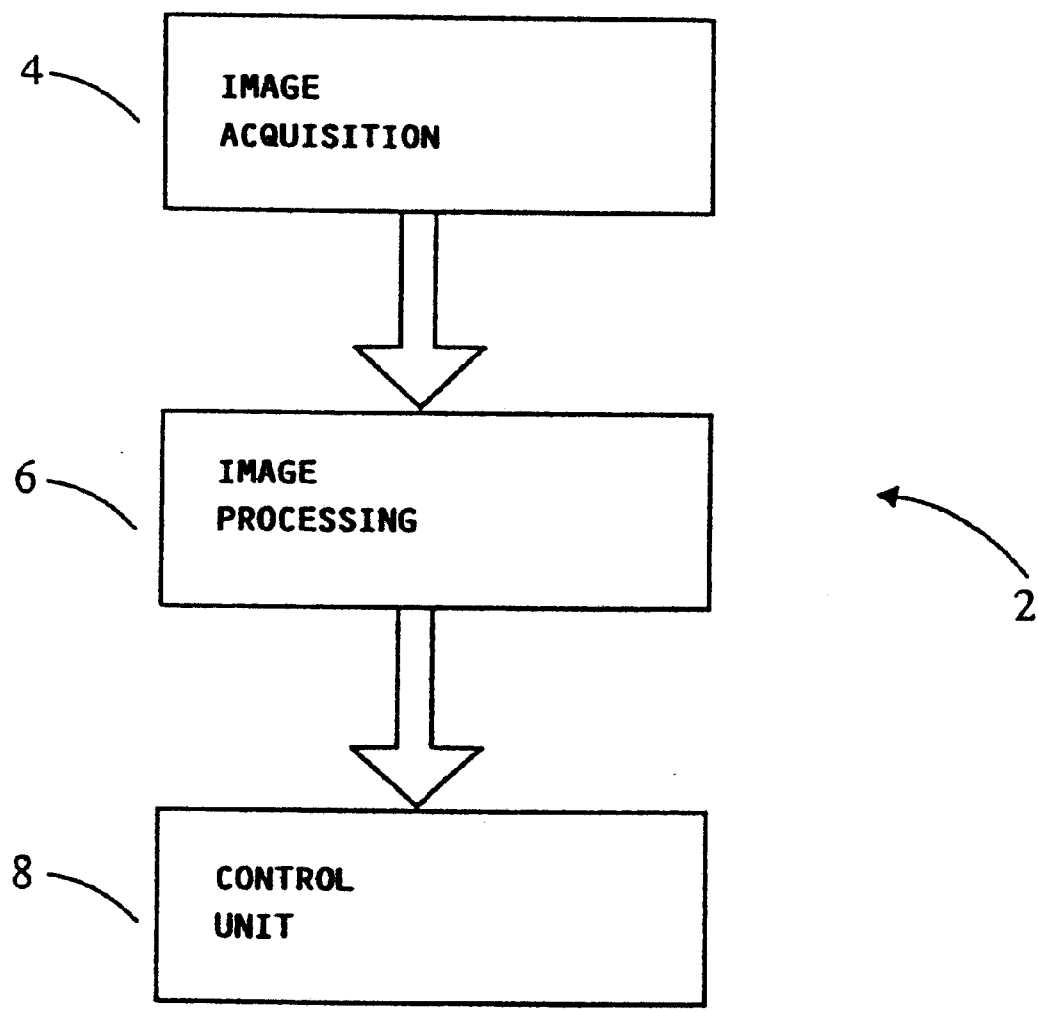
FIG. 1 is a block diagram of a system for aiding vehicle guidance.

With reference now to the figures, and in particular with reference to FIG. 1, there is illustrated a block diagram of a system 2 for aiding the guidance of vehicles, such as motor cars, lorries, and the like, in which a method according to the present invention can be used. The system 2 comprises an image acquisition unit 4, for example, a vehicle-mounted TV camera, which periodically snaps a road image. The road image is sent to an image processing unit 6 which determines a mathematical representation of the marking stripes of the road lanes and the position relative to the vehicle. These data are supplied to a control unit 8 which outputs signals for the automatic guidance of the vehicle or else, in a more simple embodiment, simple warning signals.

Figure 2:
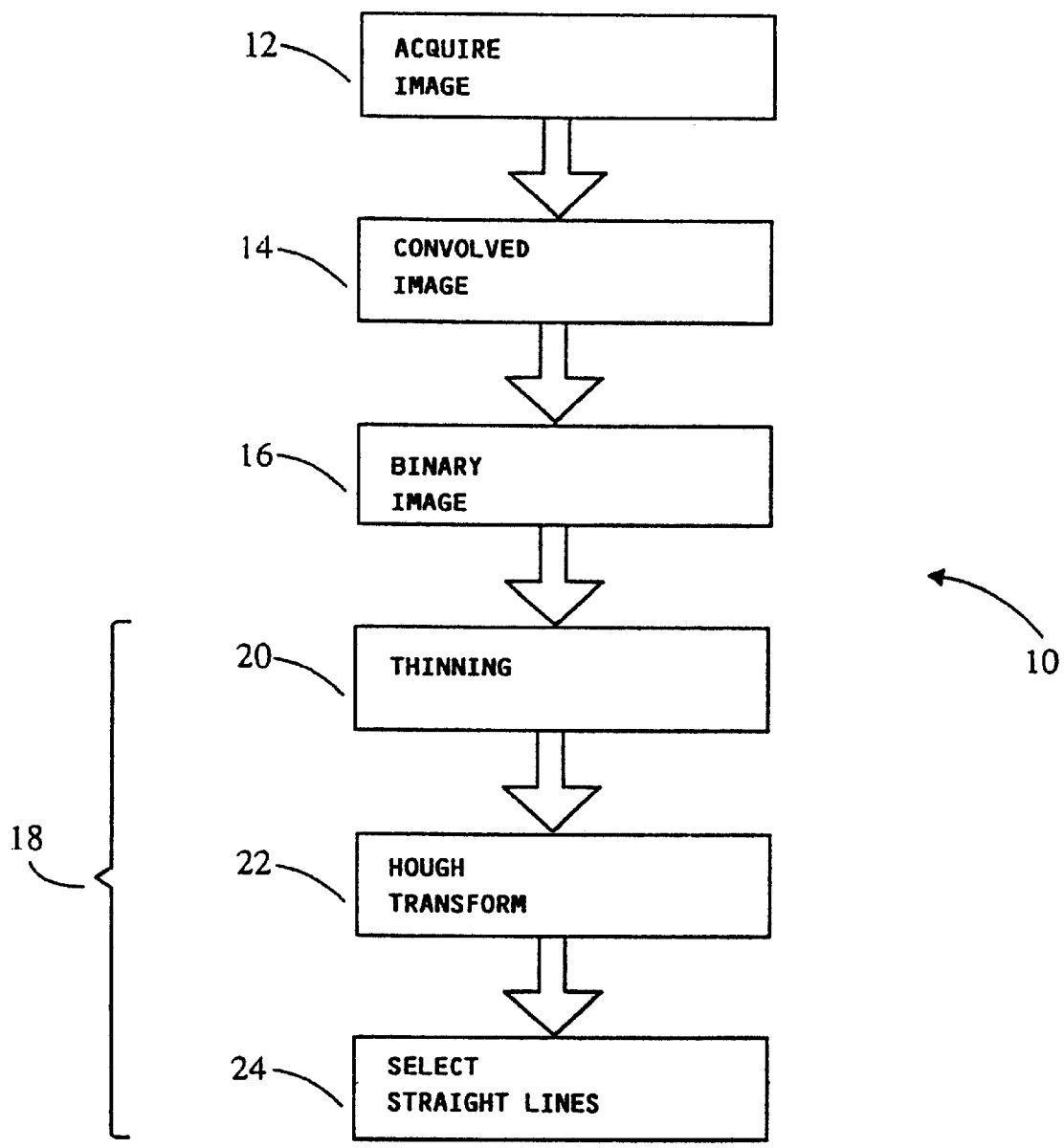
FIG. 2 illustrates a flowchart of a method according to the present invention.

With reference now to FIG. 2, there is illustrated a flowchart of a method 10 for identifying marking stripes demarcating road lanes according to the present invention. The method 10 begins in block 12 with the acquisition of a road image. The image comprises an asphalt carriageway intended for traffic, typically demarcated by two longitudinal continuous white marking lines. The carriageway is commonly divided into several lanes, each reserved for a column of vehicles which move in a specified direction, in their turn demarcated by suitable longitudinal white marking lines (continuous or otherwise). The road image further contains various objects, for example, other vehicles, road signs, buildings, shadows, and the like.

The road image is represented by a matrix of digital values with N rows and M columns (for example 512 rows by 384 columns), in which each element $I_{i,j}$ consists of a value indicative of the luminosity level (grey level) associated with an elementary area of the image (pixel). Depending on the number of bits assigned to each pixel (depth), the image can be represented with various shades of grey. For example, using a depth of five bits, each pixel can take the values from $00000_2$ to $11111_2$, corresponding to 32 different grey levels. Advantageously, the road image is reduced to just one relevant portion, such as the part below the line of the horizon, the position of which is determined by knowing the height from the ground and the angle at which the TV camera is fixed.

The method then proceeds to block 14, in which a mask matrix is set and a convolution operation is then performed between the matrix of the road image and the mask matrix so as to determine the luminosity discontinuities (light/dark) present in the road image. More particularly, a convolved image matrix is determined, the elements $C_{i,j}$ of which are given by:

$$C_{i,j} = \sum_{h=-P}^{P} \sum_{k=-Q}^{Q} I_{i+h,j+k} \cdot K_{h,k}$$

where $K_{h,k}$ are the elements of the mask, and $2 \cdot P+1$ and $2 \cdot Q+1$ are the number, respectively, of rows and of columns thereof.

The mask is of sufficiently large dimension as to make it possible at least partially to eliminate from the binary image matrix (described below) discontinuities which do not correspond to the marking stripes of the road lanes. The mask is defined in such a way as to supply significant results in the convolution operation in relation to portions of the road image relevant to the marking stripes of the lanes. For this purpose, a value L indicative of the width (in pixels) of the marking stripes of the road lanes is determined. Each row of the mask is devised in such a way as to contain L contiguous elements having a positive value, for example 1, while the other elements of the row have a value of opposite sign, for example −1, so as to define a correspondence, respectively, with the light zones (road stripes) and dark zones (asphalt) of the portion of the image. Preferably, each row further comprises one or more elements of value 0 contiguous with the L elements of value 1. These elements render the method of recognition less sensitive to the characteristics of the transition zones between the road stripes and the asphalt.

Advantageously, the elements belonging to the same column are mutually equal, and the elements of each row which are equidistant from the ends of the row have the same value, i.e.:

$$K_{i,j} = K_{i+1,j} \text{ for } i = -P \ldots P-1$$

$$K_{i,j} = K_{i,-j} \text{ for } j = 0 \ldots Q$$

The number of columns of value 1 is high enough to define a correspondence with a portion both of the left marking stripes (inclined to the right) and of the right marking stripes (inclined to the left) of the road lanes. In this way, the mask becomes relatively insensitive to the exact orientation of the marking stripes. This makes it possible to use the same mask matrix both for the marking stripes to the left and those to the right of the road lanes.

Preferably, the mask matrix has a smaller number of rows than number of columns. This arrangement provides good sensitivity to the various orientations of the marking stripes of the road lanes without requiring the use of too large a number of columns of value 1. Typically, the mask matrix has a number of rows lying between 3 and 8 (for example 5, i.e. P=2) and a number of columns lying between 20 and 40 (for example 31, i.e. Q=15).

Advantageously, the mask exhibits a near-zero mean value, i.e.:

$$\sum_{h=-P}^{P} \sum_{k=-Q}^{Q} K_{h,k} \simeq 0$$

In this way, the elements of the convolved image matrix are strongly dependent on the discontinuities present in the road image and are hardly sensitive to the absolute value of the luminosity. This provides comparable results under various conditions of illumination, for example, during a sunny daytime period, at twilight, at night with artificial illumination.

A typical example of a mask used in the method of recognition of the present invention is given by the following matrix:

```
-1 -1 -1 -1 -1 -1 -1 0 0 1 1 1 1 1 1 1 1 1 1 1 1 1 0 0 -1 -1 -1 -1 -1 -1 -1
-1 -1 -1 -1 -1 -1 -1 0 0 1 1 1 1 1 1 1 1 1 1 1 1 1 0 0 -1 -1 -1 -1 -1 -1 -1
-1 -1 -1 -1 -1 -1 -1 0 0 1 1 1 1 1 1 1 1 1 1 1 1 1 0 0 -1 -1 -1 -1 -1 -1 -1
-1 -1 -1 -1 -1 -1 -1 0 0 1 1 1 1 1 1 1 1 1 1 1 1 1 0 0 -1 -1 -1 -1 -1 -1 -1
-1 -1 -1 -1 -1 -1 -1 0 0 1 1 1 1 1 1 1 1 1 1 1 1 1 0 0 -1 -1 -1 -1 -1 -1 -1
```

In a preferred embodiment, different portions of the road image are filtered using different masks so as to take account of the apparent variation in amplitude of the marking stripes of the road lanes caused by perspective effects. In particular, the value L is modified in the course of the convolution operation, by subdividing the road images into various horizontal portions (f or example, three portions) and determining for each of them the width (in pixels) of the marking stripes and then modifying the mask matrix accordingly. The number of columns of value 1 thereby decreases on moving from the bottom to the top of the image. In order to keep the mean of the mask matrix substantially zero, the columns of value 1 eliminated and a corresponding number of columns of value −1 are substituted by columns of value 0 or else the dimensions of the mask matrix are decreased.

The method then proceeds to block 16, in which each element of the convolved image matrix is compared with a specified threshold value so as to determine a binary image matrix. The value of the threshold is chosen, within the real dynamic interval of the values of the elements of the convolved image matrix, on the basis of the ambient luminosity or of other parameters, possibly set by the user. In particular, with each element of the convolved image matrix is associated a first binary value (for example 0) if this element is less than the threshold value (black element) and a second binary value (for example 1) in the contrary case (white element). It should be noted that by using a mask with a large number of columns, the performance of the recognition method is made relatively insensitive to the particular threshold value used.

With reference now to the group of blocks 18, a representation of the marking stripes of the road lanes is determined. Typically, two straight lines are determined corresponding to the marking stripes of the lane in which the vehicle in question is traveling. This phase is carried out using the steps described below. However, a person skilled in the art will appreciate that other equivalent known methods can be used.

Considering the block 20, an operation is performed for reducing the thickness of the lines (thinning) of the binary image matrix, by determining a vector S (thinned image) whose elements $S_k$ each consist of a pair of coordinates ($x_k$, $y_k$) (column number and row number respectively) relating to the elements of the binary image matrix. In particular, this matrix is scanned row by row, and for each row, the horizontal contiguous groups of white elements (i.e., with value 1) are determined. A single element, typically the central element, is then extracted from each of these groups, and its coordinates (row and column) are inserted into the vector S.

In block 22, the method determines the straight lines corresponding to the thinned image which are a candidate for recognition. Typically this operation is performed by applying a Hough transform to the vector S. The Hough transform is a projection of a point in the plane with Cartesian coordinates x,y into a curve in the plane with polar coordinates ρ,θ, in which all the points on the same straight line in the x,y plane are projected into curves in the ρ,θ plane which intersect at a point (unique point), which represents the straight line in the x,y plane. In the case of lines which are not perfectly straight, this transform generates a distribution of points of intersection. The point with greatest density is then chosen as unique point approximating the corresponding straight line. It should be noted that the Hough transform makes it possible to identify even non-continuous lines satisfactorily, as in the case of marking lines of road lanes. In particular, the road image is subdivided into halves as a left portion and as a right portion, fixing the respectively left and right lower corners of the image as center of the polar coordinates ρ,θ. For each value of the angle $\theta_i$, the value $\rho_{k,i}$:

$$\rho_{k,i} = x_k \cdot \cos(\theta_i) + y_k \cdot \sin(\theta_i)$$

is calculated, in each of the two portions, in relation to each element $S_k = (x_k, y_k)$ of the vector S. Preferably, a discrete set of values of the angle $\theta_i$ is used, for example, 20 values such as to cover an interval (for example of 70°) in which it is expected to find the straight lines corresponding to the respectively left and right marking stripes of the road lane in which the vehicle is travelling. Two accumulation vectors are used to contain the number of occurrences of each point at the coordinates ρ,θ for, respectively, the left and right portion of the road image. Preferably, the values below a specified threshold value are zeroed, so as to eliminate residual noise from the image. The determination of the candidate straight lines is performed by extracting the local maxima from the two accumulation vectors for, respectively, the left and right portion of the image. These values are then ordered in two lists, one for each straight line to be associated with the two marking stripes (left and right) of the road lane.

The method goes lastly to block 24, in which two straight lines are selected, associated with the marking stripes of the road lane. This operation is performed by choosing the first candidates in the two lists described above which satisfy a few simple geometrical rules, for example, they intersect at a vertical height inside a specified interval based on the known position of the horizon, they intersect the lower horizontal axis inside a predetermined interval, form an angle of intersection lower than a fixed value determined by the amplitude of the road lane, and the like. Preferably, for each list, only the first three candidate straight lines are considered. If none satisfies the geometrical conditions defined above, the first candidate straight line is selected.

Figure 3:
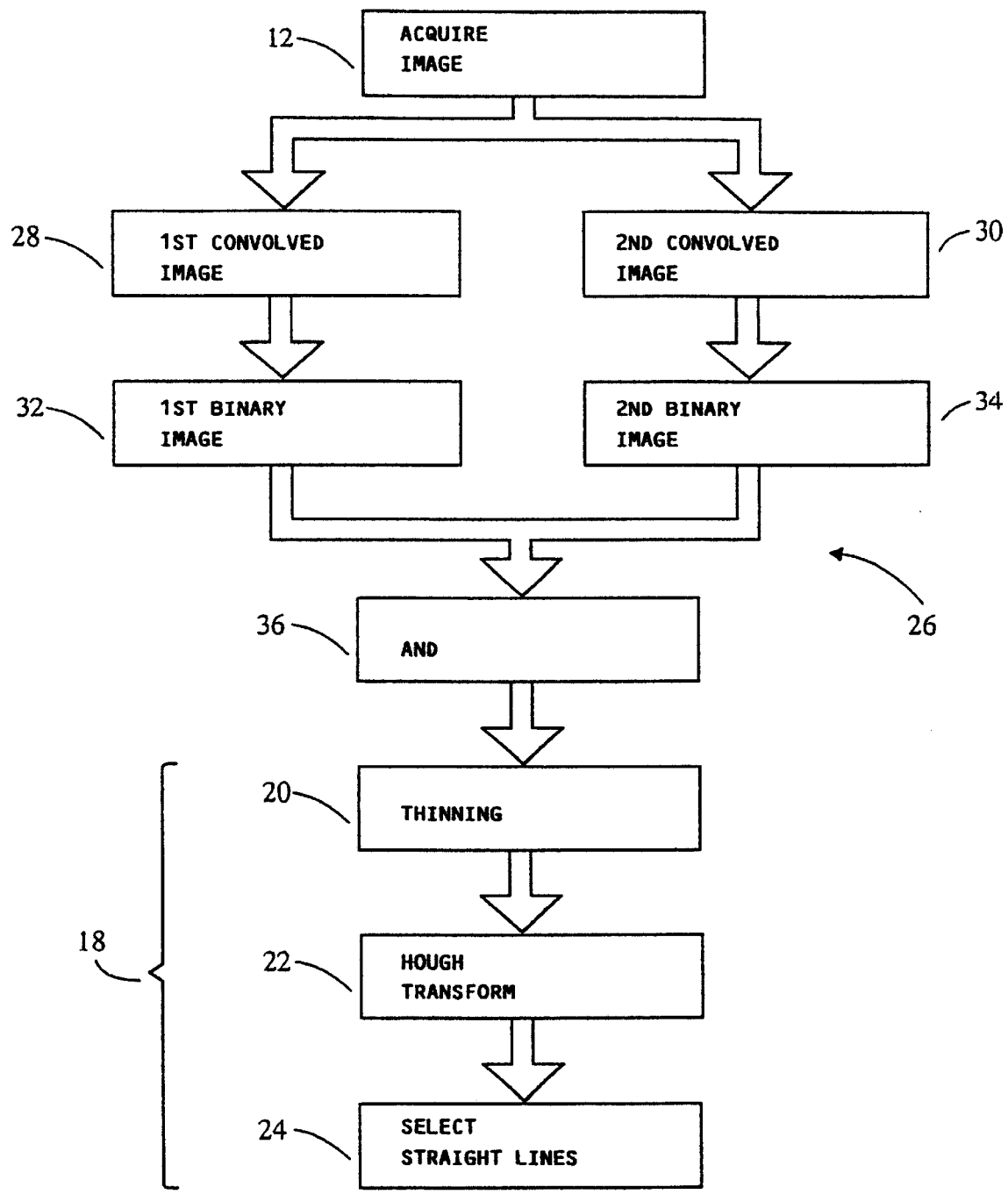
FIG. 3 shows a flowchart of an alternate embodiment of the method according to the present invention.

A variant embodiment of the method of recognition described above is illustrated in FIG. 3 (blocks common to FIG. 2 are identified with the same reference numerals). The figure illustrates a method of recognition 26 in which the matrix of the road image acquired in block 12 is subjected, typically in parallel, to two convolution operations in blocks 28 and 30 respectively. These operations are performed by using two different masks. In particular, these masks are mutually specular, i.e., the elements of each row of the mask used in block 30 are equal in reverse order to those of the corresponding row of the mask used in block 28:

$$K1_{i,j}=K2_{i,-j} \text{ for } j=-R \ldots R$$

where $K_{1i,j}$ and $K2_{i,-j}$ are the elements, respectively, of the first and of the second mask, and 2·R+1 is the common number of columns thereof. Illustrated below is an example of the first mask:

```
-1 -1 -1 -1 -1 -1 -1 -1 -1 -1 -1 -1 -1 -1 -1 0 1 1 1 1 1 1 1 1 1 1 1 1 1 1
-1 -1 -1 -1 -1 -1 -1 -1 -1 -1 -1 -1 -1 -1 -1 0 1 1 1 1 1 1 1 1 1 1 1 1 1 1
-1 -1 -1 -1 -1 -1 -1 -1 -1 -1 -1 -1 -1 -1 -1 0 1 1 1 1 1 1 1 1 1 1 1 1 1 1
-1 -1 -1 -1 -1 -1 -1 -1 -1 -1 -1 -1 -1 -1 -1 0 1 1 1 1 1 1 1 1 1 1 1 1 1 1
-1 -1 -1 -1 -1 -1 -1 -1 -1 -1 -1 -1 -1 -1 -1 0 1 1 1 1 1 1 1 1 1 1 1 1 1 1
``` and of the second mask:

```
1 1 1 1 1 1 1 1 1 1 1 1 1 1 0 -1 -1 -1 -1 -1 -1 -1 -1 -1 -1 -1 -1 -1 -1 -1
1 1 1 1 1 1 1 1 1 1 1 1 1 1 0 -1 -1 -1 -1 -1 -1 -1 -1 -1 -1 -1 -1 -1 -1 -1
1 1 1 1 1 1 1 1 1 1 1 1 1 1 0 -1 -1 -1 -1 -1 -1 -1 -1 -1 -1 -1 -1 -1 -1 -1
1 1 1 1 1 1 1 1 1 1 1 1 1 1 0 -1 -1 -1 -1 -1 -1 -1 -1 -1 -1 -1 -1 -1 -1 -1
1 1 1 1 1 1 1 1 1 1 1 1 1 1 0 -1 -1 -1 -1 -1 -1 -1 -1 -1 -1 -1 -1 -1 -1 -1
``` which are used in this embodiment of the present invention.

The convolved images produced in the two blocks 28 and 30 are then compared, in blocks 32 and 34 respectively, with a corresponding threshold value so as to obtain two distinct binary images. Typically, the two threshold values are equal to one another. Then with reference to block 36, these binary images are joined in a single matrix via a logic AND operation performed between the corresponding elements of the two distinct binary images. The method then continues to the group of blocks 18 (with the corresponding blocks 20–24), by determining the straight lines corresponding to the marking stripes of the road lanes in a manner similar to that described earlier.

This embodiment offers better performance with regard to the elimination of noise, because only double discontinuities (dark/light/dark) are picked out, typical of road marking lines, and renders the method insensitive to single luminous discontinuities (light/dark), such as for example vertical shaded lines in the middle of the carriageway or other large-size vehicles (for example lorries) which are overtaking.

Figure 4:
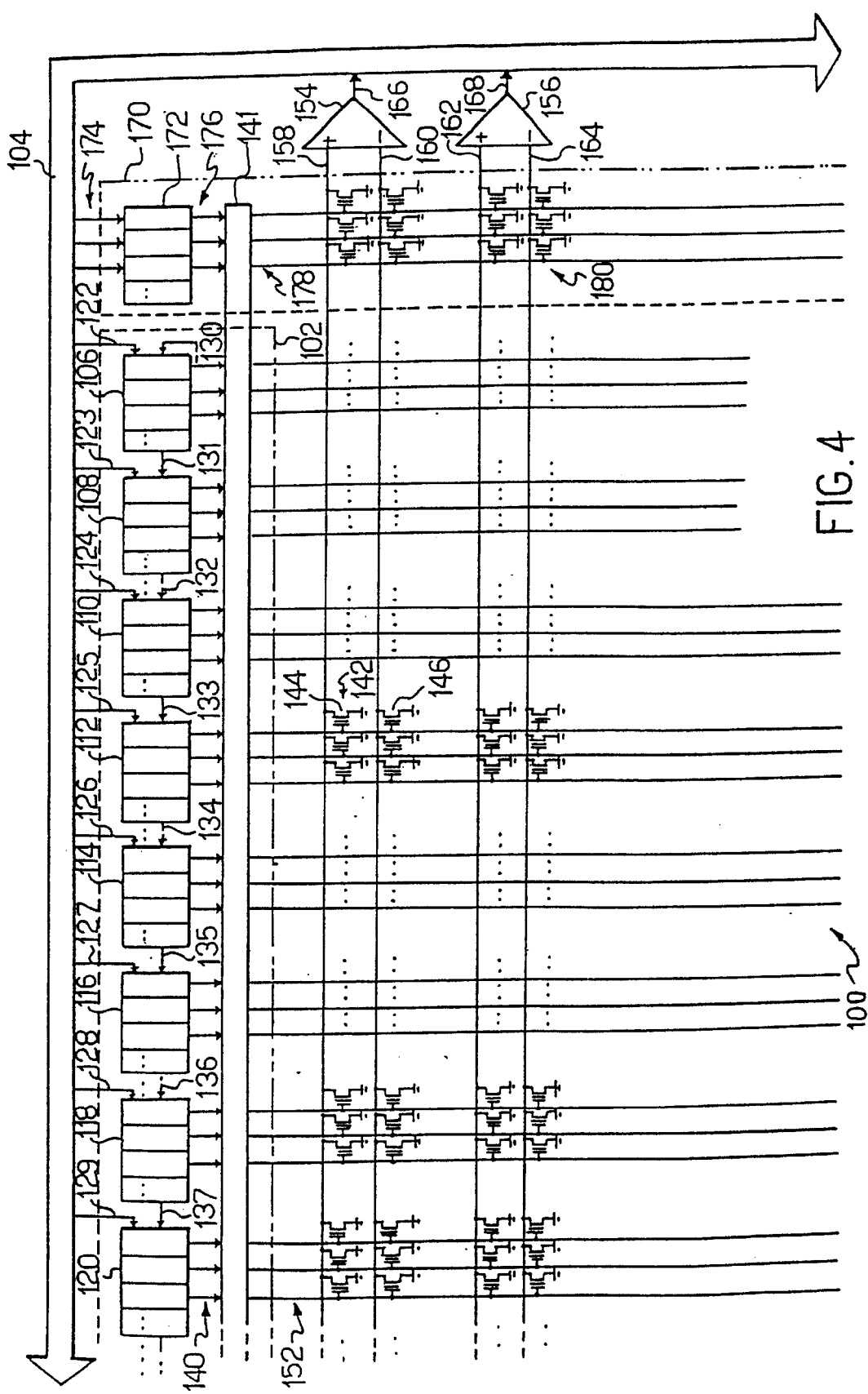
FIG. 4 is a basic diagram of an electronic device which can be used to carry out the method of the present invention.

With reference now to FIG. 4, there is illustrated a basic diagram of an electronic device 100, described in European Patent Application N.96830525.0 of Oct. 15, 1996, which can be used to embody the method of the present invention. In particular, this device embodies an artificial neural network which makes it possible to carry out the convolution operation between the image matrix and the mask matrix. The electronic device 100 comprises an input unit 102, connected to a bus 104, for example, a 64-line bus, so as to receive binary values or bits (0–1) representative of the image matrix. Commonly, the digital value 1 is represented by a positive supply voltage value Vdd (for example 5V, with respect to a reference or earth value), while the digital value 0 is represented by a 0V voltage value. The input unit 102 consists of a plurality of shift registers 106–120, typically equal in number to the number of lines of the bus 104 (in the example in question 64, only 8 of which are represented in the figure). Each shift register 106–120 consists of a plurality of cells interlinked in the usual manner. The first cell of each shift register 106–120, indicated as the cell of the least significant bit (or LSB) is connected to a corresponding line of the bus 104 via a line 122–129 so as to receive as input the binary value present on the corresponding line of the bus 104; the insertion of this binary value causes a leftward shift in the figure, of the binary values contained in the shift register 106–120.

The last cell of each shift register 106–120, indicated as the cell of the most significant bit (or MSB), is connected to the first cell of the following shift register, by means of a line 130–137 (the last cell of the last shift register is connected to the first cell of the first shift register). A suitable configuration block (not shown in the figure) contained inside each shift register 106–120 enables a specific input (from the bus 104 or from the previous shift register) for loading the binary values thereinto. This makes it possible dynamically to vary the length and number of the shift registers of the device depending on the various applicational requirements.

Preferably the shift registers 106–120 are connected, via lines 140, to a translator block 141, which transforms the voltage levels associated with the binary values contained in each cell of the shift registers 106–120. In particular, with the binary value 0 is associated a voltage value V1 (for example 2V), while with the binary value 1 is associated a voltage value Vh greater than V1 (for example 3V).

The binary values loaded into the input unit 102 are supplied to a matrix of synapses in which weights correlated with the mask matrix are stored. In particular, each synapse, for example, the synapse 142 shown in the figure, comprises a positive synapse 144 and a negative synapse 146 for storing, respectively, a positive weight and a negative weight. The synapses of each column are connected to the same line 152 and then, via the translator block 141, to the same cell of the shift registers 106–120 so as to receive as input the binary value contained in the cell, suitably transformed by the translator block 141. The synapses of each row are connected to a corresponding neuron 154, 156. In particular, the positive synapses and the negative synapses of each row are linked, respectively, to a line 158, 162 and to a line 160, 164 as input to the corresponding neuron 154, 156.

Each positive synapse and each negative synapse consists of a memory cell which embodies a breaker element with programmable conductance, as described in European Patent Application N.95830433.9 of Oct. 13, 1995. In particular, when the synapse receives as input a value corresponding to logic 0 (V1), the breaker is open, so that its conductance is zero; when the input has a value corresponding to logic 1 (Vh), the breaker is closed and its conductance is equal to a value stored therein. The breaker consists of a field-effect transistor (MOSFET) with floating gate, and in particular of a cell of an EEPROM (or $E^2$PROM) memory of flash type. The transistors 144, 146 have their source terminal linked to a reference terminal (earth); the gate terminal of the transistors 144, 146 of each column is linked to the same line 152; the drain terminals of the transistors making up the positive synapses 144 and the negative synapses 146 of each row are connected, respectively, to the corresponding line 158, 162 and 160, 164. Each transistor 144, 146 is programmed in such a way as to have a threshold voltage (Vt) correlated with the absolute value of the stored weight. In particular, a zero weight is associated with a threshold voltage Vt greater than the voltage Vh, in such a way that the transistor 144, 146 is always disabled (zero conductance) irrespective of the voltage applied to its gate terminal (V1, Vh), i.e., of the logic value input (0, 1). Weights differing from zero are associated with a threshold voltage Vt lying between V1 and Vh; for example, with the weight (in absolute value) 1 is associated the voltage Vt=2.5V, with the weight ½ the voltage Vt=2.5V+256 mV=2.756V, with the weight ¼ the voltage Vt=2.5V+256 mV+128 mV=2.884V, and so on. Typically, with the lower weight, in terms of absolute value, stored in the transistors 144, 146 is associated a threshold voltage lower than the voltage Vh by a preset value (for example 32 mV). When the voltage on the line 152 has value V1 (logic 0), the transistor 144, 146 is disabled (zero conductance); when the voltage on the line 152 has value Vh (logic 1), the conductance of the transistor 144, 146 is proportional to the difference between the voltage Vh and the threshold voltage Vt. Consequently, the conductance of each transistor 144, 146 is correlated with the product of the binary value input and the stored weight. The total conductance of each line 158, 162 is correlated with the sum of the products of the inputs for the positive weights stored, while the total conductance of each line 160, 164 is correlated with the sum of the products of the inputs for the negative weights stored.

Each neuron 154, 156 measures the total conductance of the synapses of the corresponding row and calculates a binary result dependent on this measurement. In particular, the neuron 154, 156 compares the total conductance of the positive synapses with the total conductance of the negative synapses of the corresponding row and produces the binary result as a function of this comparison, for example 1 if the total conductance of the negative synapses is greater than the total conductance of the positive synapses, or 0 in the contrary case. The neurons 154, 156 are connected to the bus 104, via lines 166, 168, so as to output these binary results; in the case of a number T of neurons (for example 256) greater than the number of lines of the bus 104, the neurons are connected to the bus 104 via a suitable multiplexer, not shown in the figure.

The device 100 furthermore comprises an unbalance block 170 which makes it possible to vary the total conductance of the positive and negative synapses of each row in a a predetermined manner. In particular, the unbalance block 170 comprises memory elements (latches) 172, for example 64, connected to the bus 104 via lines 174 so as to receive as input binary enabling values. Each memory element 172 is connected, via lines 176, to the translator block 141. The binary values contained in the memory elements 172 are supplied to a matrix of floating-gate field-effect transistors 180 suitably programmed in a manner similar to that described previously. The transistors 180 of each column are connected to the same line 176 and then, via the translator block 141, to the same memory element 172 so as to receive as input the binary value contained in the memory element 172, suitably transformed by the translator block 141; the transistors 180 of one and the same row are linked to a corresponding one of the lines 158, 164.

When a transistor 180 receives as input a value corresponding to logic 0 (V1), its conductance is always zero, so that it does not influence the total conductance of the line 158–164 to which it is linked; when a transistor 180 receives as input a value corresponding to logic 1 (Vh), its conductance is proportional to the difference between the voltage Vh and the threshold voltage Vt. By suitably programming the transistors 180 and the values contained in the memory elements 172, it is then possible to obtain output results which differ in relation to the same binary input values and to the same stored weights. For example, by increasing in a row the total conductance of the positive synapses by a value AG (threshold value of the neuron) with respect to the total conductance of the negative synapses, the result output by the corresponding neuron 154, 156 will be 1 only if the conductance correlated with the sum of the products of the input values for the negative weights exceeds the conductance correlated with the sum of the products of the input values for the positive weights by an amount at least equal to the threshold ΔG. Furthermore, this characteristic makes it possible to obtain multi-bit results, by programming equal weights on rows of synapses linked to neurons with different thresholds, or else by exchanging the values in the memory elements 172 in successive calculation cycles with equal input values. It is known that such multi-bit outputs cannot take the values of all the possible binary combinations; thus, if a generic neuron has its own output at 1, then all the neurons with a lower threshold will also have their output at 1; considering for example two neurons, the possible configurations at output will be only 00,01,11. These outputs are transformed into corresponding digital values, for example via a suitable conversion block (not shown in the figure) connected between the neurons 154, 156 and the bus 104. The unbalance block 170 described above makes it possible to embody diverse activation functions, such as the sigmoid or hyperbolic tangent, and to obtain multi-bit binary outputs.

Figure 5:
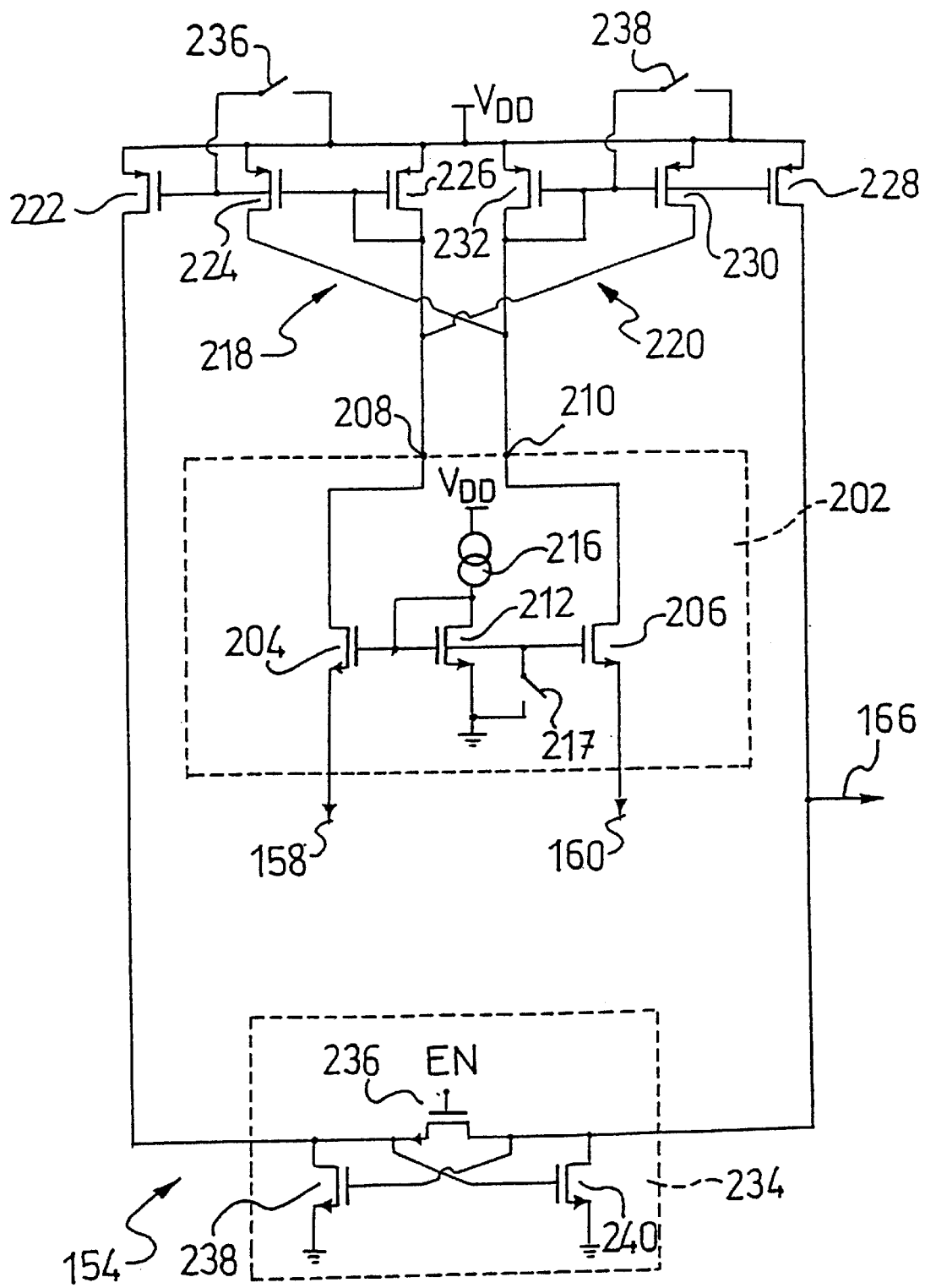
FIG. 5 illustrates a circuit diagram of a neuron used in the device of FIG. 4.

With reference now to FIG. 5, there is illustrated a circuit diagram of a neuron 154 used in the electronic device described above (elements common to FIG. 4 are identified with the same reference numerals); this structure is described in greater detail in European Patent Application N.95830433.9 cited earlier. The neuron 154 receives as input the total conductance of the positive and negative synapses of the corresponding row via, respectively, the line 158 and the line 160. The lines 158 and 160 are linked to a decoupling stage (buffer) 202, comprising two N-channel MOS transistors (NMOS) 204 and 206 having their gate terminals linked together; the source terminals of the transistors 204 and 206 are connected, respectively, to the lines 158 and 160, while the drain terminals define, respectively, an outward line 208 and 210 of the decoupling stage 202. The stage 202 comprises another nMOS transistor 212 diode-connected having its drain terminal linked to a positive supply terminal Vdd via a current generator 216; the gate terminal of the transistor 212 is linked to its own drain terminal and to the gate terminal of the transistors 204 and 206; while the source terminal is connected to the earth terminal. An electronic breaker 217 is linked between the gate terminals of the transistors 204, 206, 212 and the earth terminal; when this breaker is closed, the transistors 204, 206, 212 are disabled, in such a way as to eliminate the current in the corresponding synapses when the device is not in use. The breaker 217, jointly with a further breaker (not shown in the figure) in series with the current generator 216, makes it possible selectively to activate just the neurons actually used in a specified calculation cycle, therefore reducing the power consumption of the device.

The decoupling stage 202 causes the capacitance seen by the lines 208 and 210 to be merely that defined by the transistors 204 and 206 and not the total capacitance of the in-parallel transistors making up the corresponding synapses which, considering the very large number of synapses generally present (up to a few thousand), may be extremely high. This makes the operation of the neuron 154 very fast, of the order of a thousand GCPS (Giga Connections Per Second). The decoupling stage 202 moreover maintains a low voltage level on the lines 158 and 160, in such a way that the entire device can operate with a low supply voltage level (of the order of a few V) and low consumption of power per operation (of the order of a few tens of GCPS/mW at the maximum speed of calculation).

The neuron 154 comprises two symmetric sections 218 and 220 connected together and to the lines 208 and 210. The sections 218 and 220 each comprise three P-channel MOS transistors (pMOS), 222–226 and 228–232 respectively, having their source terminals linked to the supply terminal Vdd and their gate terminals interconnected. The transistors 226 and 232 are diode-connected, form a current mirror with the transistors, 222, 224 and 228, 230 respectively, and have their drain terminal linked to the lines 208 and 210, respectively. The drain terminals of the transistors 224 and 230 are linked to the lines 210 and 208, respectively; the drain terminals of the transistors 222 and 228 are connected to a latch circuit 234. Two electronic breakers 236 and 238 are linked between the supply terminal Vdd and the gate terminals of the transistors 222–226 and 228–232, respectively; when the device is not in use, these breakers are closed so as to keep the transistors 222–232 disabled.

The latch circuit 234 comprises an nMOS transistor 236 having its source terminal and its drain terminal connected to the drain terminals of the transistors 222 and 228 respectively; the gate terminal forms a control input for an enable signal EN. The latch circuit 234 comprises two further nMOS transistors 238 and 240 having their drain terminal connected, respectively, to the source terminal and drain terminal of the transistor 236, their gate terminal linked, respectively, to the drain terminal and source terminal of the same transistor 236 and their source terminal connected to the earth terminal. The drain terminal of the transistor 240 defines the output line 166 of the neuron 154.

The neuron 154 compares the conductances of the lines 158 and 160, by means of a comparison of the currents in the corresponding lines 208 and 210. When the breakers 217, 236, 238 are open, these currents begin to flow in the sections 218 and 220 so as to bring them into conduction. The current mirrors of the two sections are not however activated at the same speed, but the current mirror connected to the line with greater conductance (larger current) is brought into conduction more speedily. Assuming, for example, that the current in the line 208 (positive synapses) is greater than that in the line 210 (negative synapses), the transistors 224, 226 are activated more speedily than the transistors 230, 232. Since the current through the line 208 and mirrored in the line 210 is greater than that required in the latter, the excess current flows through the transistor 222.

After a brief transient, caused by the transistor 232 coming on in the steady state, almost all the current required by the lines 208, 210 is provided by the section connected to the line with larger current (section 218 in the example), while the other section is almost dead.

When the enable signal EN disables the transistor 236, the transistor 240, whose gate terminal is connected to the active section 218 and hence to the supply terminal Vdd, is brought into conduction, connecting the output 166 to the earth terminal (logic 0). Conversely, if the current in the line 210 (negative synapses) is greater than that in the line 208 (positive synapses), the section 220 and the transistor 238 are conducting, while the section 218 and the transistor 240 are disabled, so that the output 166 is connected to the supply terminal Vdd through the transistor 238 (logic 1). The value output on the line 166 is stored in a suitable memory element (not shown in the figure) and the computation in the neuron 154 is therefore switched off.

It should be noted that the computation time of each neuron depends on the strength of the current in the section 218 and 220 and on their difference, in that larger currents reduce the activation times of the sections 218, 220 and hence the computation time of the neuron 154. Since the computation time of each neuron is not predictable, it is fixed at a sufficiently high value so as to ensure correct computation in the various operational situations. As an alternative, the neuron 154 moreover comprises a logic block (not shown in the figure) for automatically timing the computation of this neuron 154. In particular, when the enable signal EN disables the transistor 236, the voltage at the drain terminals of the transistors 238 and 240 begins to become unbalanced, until it is carried to a value Vdd on one of them and to a value 0V on the other. As soon as the voltage of the terminal which is being carried to logic 1 (Vdd) exceeds a threshold voltage corresponding to this value (for example 2.5V) and the voltage of the terminal which is being carried to logic 0 (0V) falls below a threshold voltage corresponding to this value (for example 0.8V) the computation in the neuron 154 is switched off. The calculation cycle of the electronic device is terminated as soon as the last active neuron has terminated the computation. This makes it possible to increase the speed of the electronic device and to reduce its power consumption.

Figure 6:
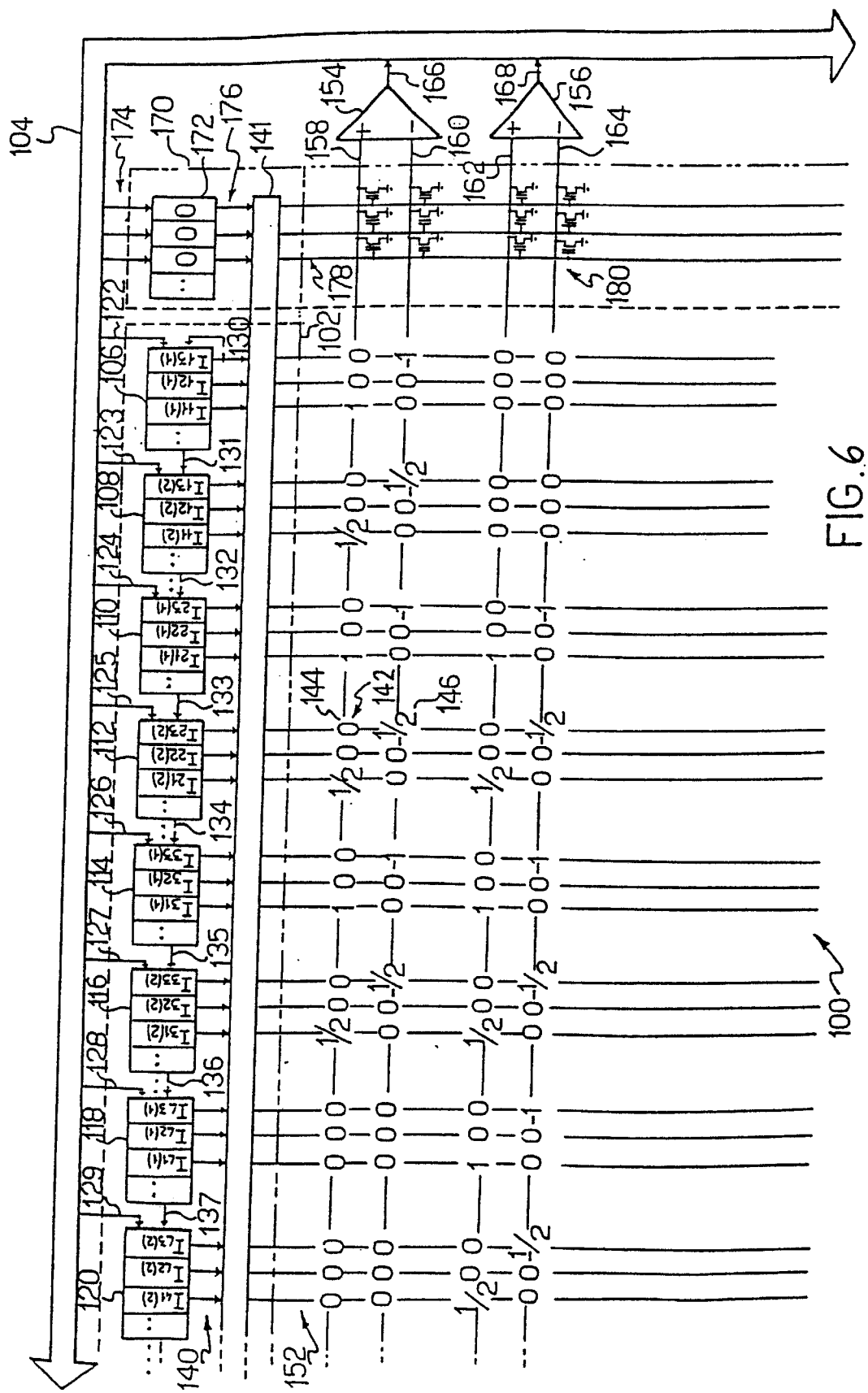
FIG. 6 illustrates an example of the operation of the device of FIG. 4.

To describe the operation of this electronic device, reference is made to the example, illustrated in FIG. 6, of convolution between an image matrix and a mask matrix (elements already represented in FIG. 4 are identified with the same reference numerals). For simplicity of description, the unbalance block 170 is regarded as inactive (contents of memory elements 172 at 0) and the following Prewitt operator with 3 rows and 3 columns:

$$\begin{matrix} 1 & 0 & -1 \\ 1 & 0 & -1 \\ 1 & 0 & -1 \end{matrix}$$

is used as mask matrix. However, a person skilled in the art will appreciate that this electronic device lends itself particularly for use with large-size masks, as in a method according to the present invention.

The image matrix is scanned, typically from the top left corner (element $I_{1,1}$) to the bottom right corner (element $I_{N,M}$), and its elements are loaded into the input unit 102. In particular, the most significant bits (MSB) of the first row are loaded into the shift register 106. These data are inserted one column after the other (from left to right), by shifting (leftwards) the preexisting data in the shift register 106, until a number of columns equal to those of the mask matrix, i.e. 3 in the example in question ($I_{1,1(1)}$, $I_{1,2(1)}$, $I_{1,3(1)}$), are inserted. Similarly, the second most significant bits (MSB-1) of the first row ($I_{1,1(2)}$, $I_{1,2(2)}$, $I_{1,3(2)}$) are loaded into the shift register 108, and so on until the least significant bits (LSB) thereof are inserted. In similar manner, the elements of the second row of the image matrix are loaded into the shift registers 110, 112 etc., those of the third row into the shift registers 114, 116 etc., those of the fourth into the shift registers 118, 120 etc., and so on. The number of rows of the image matrix which is loaded in parallel into the input unit 102 is at least equal to the number of rows of the mask matrix, i.e. 3 in the example illustrated. The loading of further rows advantageously makes it possible (in the case of a matrix of synapses with more than one row) to increase the degree of parallelism of the convolution operation, as described in detail below.

Stored in the synapses of the first row which are linked to the first 3 cells of the shift register 106 are weights equal to the elements of the first row of the mask matrix. The positive values are stored in the positive synapses, while the negative values are stored in the negative synapses. When a synapse (positive/negative) is programmed, the other corresponding synapse is set to 0. Likewise, stored in the synapses of the same first row which are linked to the first 3 cells of the shift register 108 are weights equal to the halved values of the elements of the first row of the mask matrix, in such a way as correctly to take into account the value of the bits (MSB-1) loaded into the shift register 108, and so on up to the synapses linked to the shift register into which the least significant bits (LSB) of the first row of the image matrix are loaded. Similarly, stored in the synapses of the first row which are linked to the cells of the shift registers 110, 112 etc., are weights correlated with the elements of the second row of the mask matrix, and stored in the synapses linked to the cells of the shift registers 114, 116 etc. are weights correlated with the elements of the third row. The other synapses of the first row which are not needed for storing weights correlated with the mask matrix are programmed to 0, in such a way that the values present in the shift registers in relation to columns which are not used for the mask matrix do not yield any uncontrolled contribution to the result. The neuron 154 linked to the first row of synapses thus produces as output on the bus 104 the first result of the first row ($C_{1,1}$) of the convolution operation.

Weights correlated with the mask matrix are stored also in the synapses of the second row, similar to what was described previously but in such a way as to disregard the first row of the image matrix. In particular, stored in the synapses of the second row which are linked to the cells of the shift registers 110, 112, etc. are weights correlated with the elements of the first row of the mask matrix, stored in the synapses linked to the cells of the shift registers 114, 116, etc. are weights correlated with the elements of the second row, and stored in the synapses linked to the cells of the shift registers 118, 120, etc., are weights correlated with the elements of the third row. The other synapses of the second row are programmed to 0. In this way, it is as if the mask matrix had been shifted, relative to the image matrix, downwards by one row. The neuron 156 linked to the second row of synapses thus produces as output on the bus 104 the first result of the second row ($C_{2,1}$) of the convolution operation. By iterating the procedure, a third row of synapses corresponding to a third neuron (which are not shown in the figure) are suitably programmed in such a way as to store weights correlated with the mask matrix shifted downwards by two rows, and so on. The maximum degree of parallelism obtainable (MaxPar), T being the total number of neurons, L the depth of the image matrix and P the number of rows of the mask matrix, is given by the formula:

$$MaxPar=INT(T/L)-P+1$$

For example, assuming the use of a device with T=264 neurons and an image matrix in which each element is represented by 5 bits (L=5), the maximum degree of parallelism obtainable is INT(264/5)−3+1=50. The rows of the image matrix are thus scanned from left to right, obtaining in parallel the result of the first MaxPar rows of the convolution operation. Once the insertion of the last column of the image matrix has terminated, we go down a number of rows equal to the value of MaxPar and recommence from the first column of the new rows. The convolution operation is completed after processing the last column of the last row.

Obviously, for the purposes of satisfying contingent and specific requirements, a person skilled in the art will be able to make numerous modifications and variations to the method described above, all contained however within the scope of protection of the invention, as defined by the following claims.

While the invention has been particularly shown and described with reference to specific embodiments thereof, it will be understood by those skilled in the art that various changes in form and detail may be made thereto, and that other embodiments of the present invention beyond embodiments specifically described herein may be made or practice without departing from the spirit and scope of the present invention as limited solely by the appended claims.

What is claimed is:

1. A method, in a system for aiding the guidance of a vehicle, for identifying marking stripes demarcating at least one road lane in a road image represented by a matrix of elements each indicative of the luminosity level of an elementary portion of the image, the method comprising the steps of:

setting a mask matrix;

determining a convolved image matrix via a convolution operation between the matrix of the road image and the mask matrix so as to identify luminosity discontinuities present in the image;

determining a binary image matrix in which each element has a first (0) or a second (1) binary value depending on the result of a comparison of a corresponding element of the convolved image matrix with a threshold value;

determining from the binary image matrix a representation of the marking stripes; and wherein said step of setting the mask matrix includes determining a value L indicative of the number of elements of the image matrix corresponding to the width of the marking stripes wherein each row of the mask matrix comprises:

L contiguous elements having a first value;

at least one element having a value of zero being contiguous to and located on both sides of said L contiguous elements; and a plurality of elements being contiguous to said at least one element having a value of zero and being located at the left and right ends of each row, said plurality of elements being a second value of opposite sign to said first value.

2. The method according to claim 1, wherein the first value of the mask matrix is 1 and the second value of the mask matrix is −1.

3. The method according to claim 2, wherein each row of the mask matrix comprises at least one element of value 0 contiguous with the L elements.

4. The method according to claim 2, wherein the mask matrix has a substantially zero mean value.

5. The method according to claim 1, wherein the elements of each row of the mask matrix which are equidistant from the ends of the row are equal.

6. The method according to claim 5, wherein the elements of the mask matrix which belong to one and the same column are equal.

7. The method according to claim 5, further comprising the step of modifying at least once during the convolution operation the value L and the contents of the mask matrix.

8. The method according to claim 2, wherein the elements of the mask matrix which belong to one and the same column are equal.

9. The method according to claim 1, wherein the mask matrix has a smaller number of rows than number of columns.

10. The method according to claim 2, further comprising the step of modifying at least once during the convolution operation the value L and the contents of the mask matrix.

11. The method according to claim 1, wherein each row of the mask matrix comprises at least one element of value 0 contiguous with the L elements.

12. The method according to claim 11, wherein the elements of the mask matrix which belong to one and the same column are equal.

13. The method according to claim 11, further comprising the step of modifying at least once during the convolution operation the value L and the contents of the mask matrix.

14. The method according to claim 11, wherein the mask matrix has a substantially zero mean value.

15. The method according to claim 1, wherein the mask matrix has a substantially zero mean value.

16. The method according to claim 15, wherein the elements of the mask matrix which belong to one and the same column are equal.

17. The method according to claim 15, wherein the mask matrix has a smaller number of rows than number of columns.

18. The method according to claim 15, further comprising the step of modifying at least once during the convolution operation the value L and the contents of the mask matrix.

19. The method according to claim 1, wherein the elements of the mask matrix which belong to one and the same column are equal.

20. The method according to claim 19, further comprising the step of modifying at least once during the convolution operation the value L and the contents of the mask matrix.

21. The method according to claim 1, wherein the mask matrix has a smaller number of rows than number of columns.

22. The method according to claim 21, wherein the mask matrix has a number of rows lying between 3 and 8 and a number of columns lying between 20 and 40.

23. The method according to claim 22, further comprising the step of modifying at least once during the convolution operation the value L and the contents of the mask matrix.

24. The method according to claim 21, further comprising the step of modifying at least once during the convolution operation the value L and the contents of the mask matrix.

25. The method according to claim 1, further comprising the step of modifying at least once during the convolution operation the value L and the contents of the mask matrix.

26. The method according to claim 25, wherein the value L is modified twice during the convolution operation.

27. The method according to claim 26, where in the dimensions of the mask matrix are modified in relation with the modification of the value L.

28. The method according to claim 25, wherein the dimensions of the mask matrix are modified in relation with the modification of the value L.

29. The method according to claim 1, wherein the number of said plurality of elements being a second value is substantially equal to L/2.

30. The method according to claim 1, wherein said first value is +1.

31. The method according to claim 1, wherein said first value is −1.

32. A method, in a system for aiding the guidance of a vehicle, for identifying marking stripes demarcating at least one road lane in a road image represented by a matrix of elements each indicative of the luminosity level of an elementary portion of the image, the method comprising the steps of:

determining a first and a second convolved image matrix via a convolution operation between the matrix of the road image and, respectively, a first and a second mask matrix so as to identify luminosity discontinuities present in the image, the elements of each row of the second mask matrix being equal in reverse order to the elements of a corresponding row of the first mask matrix;

determining a first and a second binary image matrix in which each element has a first (0) or a second (1) binary value depending on the result of a comparison of a corresponding element, respectively, of the first and of the second convolved image matrix with, respectively, a first and a second threshold value;

determining a single binary image matrix via a logic AND operation between the corresponding elements of the first and of the second binary image matrix; and determining from the single binary image matrix a representation of the marking stripes.

33. The method according to claim 32, wherein the elements of a left half of the first mask matrix have a first value and the elements of a right half of the first mask matrix have a second value of opposite sign to the first value.

34. The method according to claim 33, wherein the first value of the mask matrix is 1 and the second value of the mask matrix is −1.

35. The method according to claim 34, wherein the first and the second mask matrix have a substantially zero mean value.

36. The method according to claim 34, wherein the first and the second mask matrix have a smaller number of rows than number of columns.

37. The method according to claim 34, wherein the first and the second threshold value are equal.

38. The method according to claim 34, wherein the first mask matrix comprises at least one column of elements of value 0 lying between the left half and the right half.

39. The method according to claim 33, wherein the first mask matrix comprises at least one column of elements of value 0 lying between the left half and the right half.

40. The method according to claim 39, wherein the first and the second mask matrix have a substantially zero mean value.

41. The method according to claim 39, wherein the first and the second threshold value are equal.

42. The method according to claim 39, wherein the first and the second mask matrix have a smaller number of rows than number of columns.

43. The method according to claim 32, wherein the first and the second mask matrix have a substantially zero mean value.

44. The method according to claim 32, wherein the first and the second mask matrix have a smaller number of rows than number of columns.

45. The method according to claim 32, wherein the first and the second threshold value are equal.

46. The method according to claim 32, wherein the first and the second mask matrix have a substantially zero mean value.

47. The method according to claim 46, wherein the first and the second mask matrix have a smaller number of rows than number of columns.

48. The method according to claim 46, wherein the first and the second threshold value are equal.

49. The method according to claim 32, wherein the first and the second mask matrix have a smaller number of rows than number of columns.

50. The method according to claim 49, wherein the first and the second threshold value are equal.

51. The method according to claim 49, wherein the first and the second mask matrix have a number of rows lying between 3 and 8 and a number of columns lying between 20 and 40.

52. The method according to claim 51, wherein the first and the second threshold value are equal.

53. The method according to claim 32, wherein the first and the second threshold value are equal.

54. An apparatus, in a system for aiding the guidance of a vehicle, for identifying marking stripes demarcating at least one road lane in a road image represented by a matrix of elements each indicative of the luminosity level of an elementary portion of the image, the apparatus comprising:

a circuit for setting a mask matrix;

a circuit for determining a convolved image matrix via a convolution operation between the matrix of the road image and the mask matrix so as to identify luminosity discontinuities present in the image;

a circuit for determining a binary image matrix in which each element has a first (0) or a second (1) binary value depending on the result of a circuit comparing a corresponding element of the convolved image matrix with a threshold value;

a circuit for determining from the binary image matrix a representation of the marking stripes; and a circuit for determining a value L indicative of the number of elements of the image matrix corresponding to the width of the marking stripes, said circuit for setting said mask matrix further:

setting L elements of the mask matrix to a first value;

setting at least one element having a value of zero being contiguous to and located on both sides of said L elements; and setting a plurality of elements being contiguous to said at least one element having a value of zero and being located at the left and right ends of each row, said plurality of elements being a second value of opposite sign to said first value.

55. The method according to claim 54, wherein the number of said plurality of elements being a second value is substantially equal to L/2.

56. The method according to claim 54, wherein said first value is +1.

57. The method according to claim 54, wherein said first value is −1.

58. An apparatus, in a system for aiding the guidance of a vehicle, for identifying marking stripes demarcating at least one road lane in a road image represented by a matrix of elements each indicative of the luminosity level of an elementary portion of the image, the apparatus comprising:

a circuit for determining a first and a second convolved image matrix via a convolution operation between the matrix of the road image and, respectively, a first and a second mask matrix so as to identify luminosity discontinuities present in the image, the elements of each row of the second mask matrix being equal in reverse order to the elements of a corresponding row of the first mask matrix;

a circuit for determining a first and a second binary image matrix in which each element has a first (0) or a second (1) binary value depending on the result of a comparison of a corresponding element, respectively, of the first and of the second convolved image matrix with, respectively, a first and a second threshold value;

a circuit for determining a single binary image matrix via a logic AND operation between the corresponding elements of the first and of the second binary image matrix; and a circuit for determining from the single binary image matrix a representation of the marking stripes.

* * * * *

UNITED STATES PATENT AND TRADEMARK OFFICE
CERTIFICATE OF CORRECTION

PATENT NO.     : 6,212,287 B1
DATED          : April 3, 2001
INVENTOR(S)    : Olivieri et al.

Page 1 of 1

It is certified that error appears in the above-identified patent and that said Letters Patent is hereby corrected as shown below:

Column 3,
Line 17, delete "EMBODIMENT OP" replace with -- EMBODIMENT OF --

Column 5,
Line 19, delete "(f or example, three portions)" replace with -- (for example, three portions) --

Column 9,
Line 61, delete the second occurrence of "a"

Column 10,
Line 21, delete "AG" replace with -- $\Delta G$ --
Line 55, delete "(NMOS) replace with -- (nMOS) --

Signed and Sealed this

Sixteenth Day of October, 2001

Attest:

NICHOLAS P. GODICI
Attesting Officer    Acting Director of the United States Patent and Trademark Office